June 6, 1944. L. T. IVEY 2,350,461
POULTRY FEEDER
Filed April 17, 1942
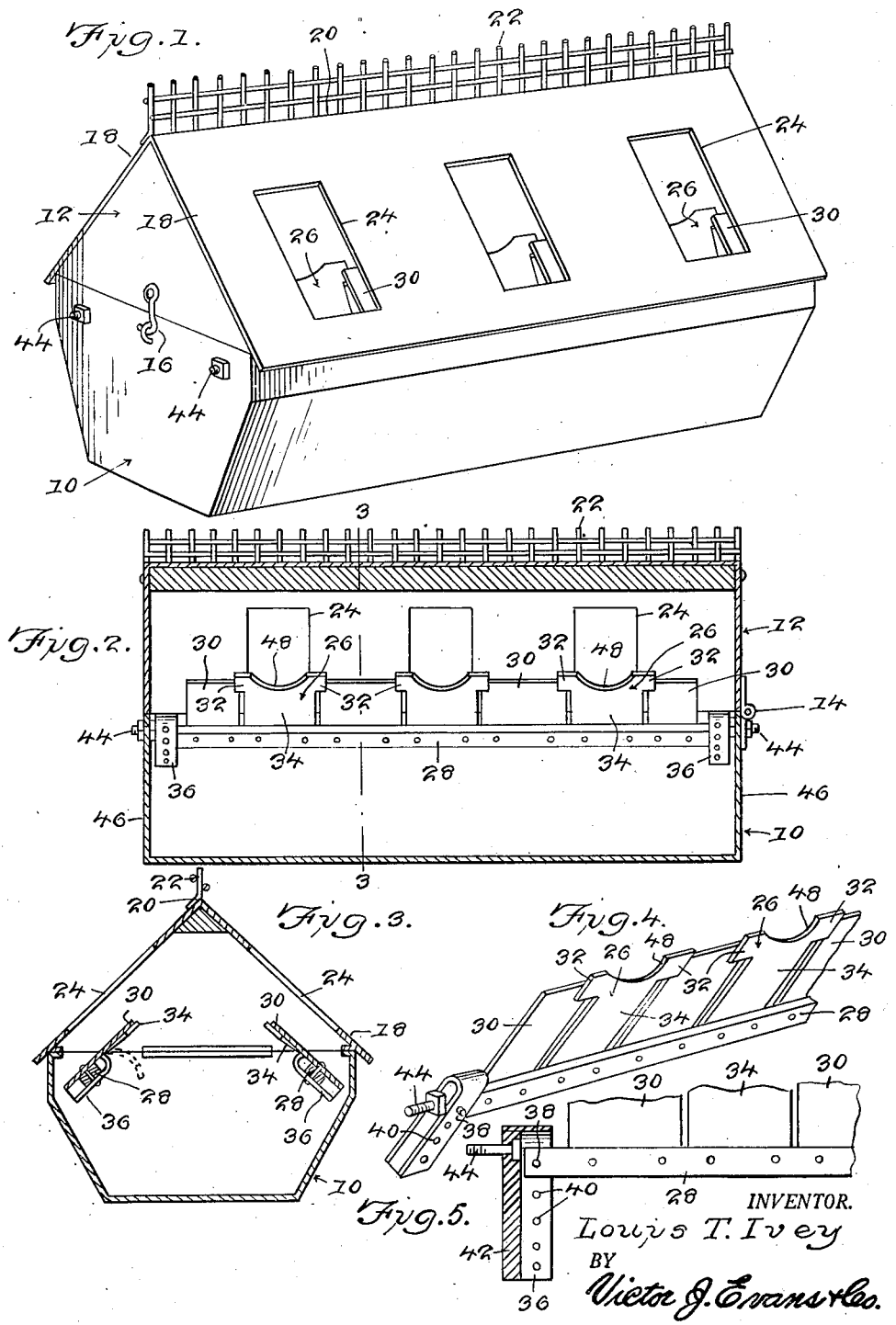
INVENTOR.
Louis T. Ivey
BY
Victor J. Evans & Co.
ATTORNEYS Patented June 6, 1944

2,350,461

UNITED STATES PATENT OFFICE 2,350,461

POULTRY FEEDER

Louis T. Ivey, Green Cove Springs, Fla.

Application April 17, 1942, Serial No. 439,409

3 Claims. (Cl. 119—61)

This invention relates to poultry feeding devices.

An object of my invention is to provide a poultry feeding device embodying a feed container wherein novel means are incorporated for eliminating waste.

In the accompanying drawing:

Figure 1 is a perspective view of a feeding device in accordance with my invention;

Figure 2 is a longitudinal sectional view;

Figure 3 is a sectional view taken along the line 3—3 of Figure 2;

Figure 4 is a fragmentary perspective view of one of the feed deflecting devices; and Figure 5 is an elevational view of the structure of Figure 4.

In the embodiment selected for illustration, I make use of a container 10 and a top section 12 having one end hingedly connected with the section 10, as by a hinge 14. A hook 16 is provided for latching the top section to the bottom section 10. Top section 12 includes two upwardly converging plates or walls 18 meeting to provide a rather sharp edge 20 having wire mesh 22 secured thereto to prevent the poultry from roosting on the feeder. Walls 18 are also inclined to such degree as to prevent the poultry from roosting thereon.

Each of the walls 18 is provided with a series of feeding openings 24. Each opening is partially closed by a flexible deflector 26, which may comprise suitable rubber plates. Figure 3 illustrates the deflectors 26 as paralleling their respective walls 18 but spaced therefrom so that any feed spilled over and around the deflectors by the poultry may fall into the section 10.

The deflectors 26 have their lower edges secured to bars 28 extending substantially the full length of the section 10. Rigid plates 30 are interposed between the spaced deflectors 26, which plates are secured to the bars 28. Each deflector 26 is provided with two ears 32 engaging two plates 30 in their normal positions. The bodies 34 of the deflectors 26 fit loosely between the adjacent edges of the respective plates 30 so as to flex freely when engaged by poultry feeding through the openings 24.

U-shaped members 36 are provided at the ends of the bars 28, the ends of the bars fitting between the legs of the members 36 and made secure by bolts 38. A series of openings 40 is provided in each of the members 36 so that the bars 28 may be adjusted to different vertical positions depending upon the size of the poultry. A wall 42 is fixedly secured to each member 36, which wall is provided with a bolt 44 through the medium of which the member may be fixedly secured to an end wall 46 of the section 10. Figure 2 illustrates the two members 36 of one bar 28 secured to the two end walls 46. While Figure 3 illustrates the plates 30 and the deflectors 26 as paralleling the walls 18, the members 36 may be adjusted about the axes of the bolts 44 to vary the spacing between these members and their respective walls 18.

In operation, poultry feeding through the openings 24 flex the deflectors 26 downwardly. Recesses 48 are provided in the upper edges of the deflectors 26 so as to provide contours which extend about considerable portions of the necks of the poultry. Thus the deflectors 26 prevent feed from being spilled through the openings 24. Should any feed be spilled about the deflectors, such feed will drop back to the section 10 by reason of the spacing between the deflectors and the walls 18, and the section 10. Plates 30 also function as deflectors to prevent spilling of the feed through the openings 24. The bars 28 may be shifted vertically or adjusted about the axes of the bolts 44 to accurately position the deflectors 26 and the plates 30 with respect to the walls 18 to adjust the feeder to the needs of poultry of different sizes.

Without further elaboration, the foregoing will so fully illustrate my invention, that others may, by applying current knowledge, readily adapt the same for use under various conditions of service.

I claim:

1. A poultry feeder comprising a container having a wall provided with feeding openings, a support inside said container, a plurality of spaced plates mounted on said support, yielding feed deflectors interposed between said plates and mounted on said support, said deflectors having formations engaging said plates in the normal positions of the deflectors, said deflectors being arranged to be engaged by poultry feeding through said openings to be moved inwardly of the container, said deflectors being spaced from said wall to provide a return spillway for feed scattered over the deflectors, and means adjustably mounting said support.

2. A poultry feeding device comprising a bottom feed containing section, a top section having walls converging upwardly to an edge, said walls being provided with feeding openings, two supports mounted inside said bottom section, spaced first deflector plates mounted on said supports, flexible deflectors interposed between said first deflectors and mounted on said supports, said flexible deflectors having formations engaging said first deflectors in the normal positions of the flexible deflectors, said flexible deflectors extending across the feeding openings to be engaged by poultry feeding therethrough to be flexed inwardly by the poultry but restrained from outward movement by said first deflectors, said flexible deflectors having recessed edges engaging the necks of poultry feeding through said openings, said first deflectors and said flexible deflectors being spaced from said walls and said bottom section to provide return spillways for feed scattered over the first and flexible deflectors, and means adjustably mounting said supports to shift the first and flexible deflectors relatively to their respective walls and said bottom section.

3. The invention described in claim 2 wherein said supports comprise bars and in which said means comprise U-shaped elements having the ends of the bars adjustably mounted therein, and bolt means for adjustably securing the U-shaped members to said bottom section.

LOUIS T. IVEY.